(12) United States Patent
Rupawalla et al.

(10) Patent No.: US 12,254,106 B2
(45) Date of Patent: Mar. 18, 2025

(54) CLIENT ISOLATION WITH NATIVE CLOUD FEATURES

(71) Applicant: Schlumberger Technology Corporation, Sugar Land, TX (US)

(72) Inventors: Mohammed Rupawalla, Katy, TX (US); Hrvoje Markovic, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 716 days.

(21) Appl. No.: 17/594,913

(22) PCT Filed: May 9, 2019

(86) PCT No.: PCT/US2019/031424
§ 371 (c)(1),
(2) Date: Nov. 3, 2021

(87) PCT Pub. No.: WO2020/226648
PCT Pub. Date: Nov. 12, 2020

(65) Prior Publication Data
US 2022/0222363 A1   Jul. 14, 2022

(51) Int. Cl.
*H04L 29/06* (2006.01)
*G06F 9/455* (2018.01)
(Continued)

(52) U.S. Cl.
CPC ...... *G06F 21/6218* (2013.01); *G06F 9/45558* (2013.01); *G06F 21/31* (2013.01); *G06F 21/606* (2013.01)

(58) Field of Classification Search
CPC .... G06F 21/31; G06F 21/606; G06F 21/6218; G06F 9/45558
See application file for complete search history.

(56) References Cited

U.S. PATENT DOCUMENTS 5,991,802 A    11/1999  Allard et al.
10,911,237 B2 *  2/2021  Zubov ................. G06F 11/1469
(Continued)

FOREIGN PATENT DOCUMENTS

CN    102420846 A    4/2012
CN    104769911 A    7/2015
(Continued)

OTHER PUBLICATIONS

Jaemyung Kim et al., Database High Availability Using SHADOW Systems, Aug. 27, 2015, ACM, pp. 209-221. (Year: 2015).*
(Continued)

*Primary Examiner* — Luu T Pham
*Assistant Examiner* — Fahimeh Mohammadi
(74) *Attorney, Agent, or Firm* — Jeffrey D. Frantz

(57) ABSTRACT

A primary request is received that includes a primary identity. The service is within a service container group project hosted by a cloud provider. A shadow request is generated from the primary request. The shadow request includes a shadow identity linked to the primary identity. The shadow request is authorized by verifying that the shadow identity has access to the service. A tenant token is generated for the shadow identity in response to authorizing the shadow request. An access token is obtained using native authorization of the cloud provider in exchange for the tenant token. Tenant data is accessed from a tenant data repository using the access token. A shadow response is obtained that is generated for the shadow identity and includes processed tenant data generated. A primary response is sent that is for the primary identity and is generated from the shadow response.

17 Claims, 10 Drawing Sheets

(51) Int. Cl.
*G06F 21/31* (2013.01)
*G06F 21/60* (2013.01)
*G06F 21/62* (2013.01)

(56) References Cited

U.S. PATENT DOCUMENTS

| | | | | |
|---|---|---|---|---|
| 10,986,082 B2* | 4/2021 | Singleton, IV | ....... | G06F 9/5027 |
| 10,992,657 B1* | 4/2021 | Stevens | ................. | H04L 63/102 |
| 2006/0123234 A1 | 6/2006 | Schmidt et al. | | |
| 2006/0123472 A1* | 6/2006 | Schmidt | .............. | H04L 63/0815 |
| | | | | 726/8 |
| 2006/0236382 A1* | 10/2006 | Hinton | .................... | G06F 21/41 |
| | | | | 726/8 |
| 2012/0207292 A1* | 8/2012 | Rosenberg | ............ | H04L 51/046 |
| | | | | 379/93.01 |
| 2014/0215595 A1 | 7/2014 | Prasad et al. | | |
| 2014/0280821 A1 | 9/2014 | Maitland et al. | | |
| 2014/0337954 A1* | 11/2014 | Ahmed | ............... | H04L 63/0815 |
| | | | | 726/8 |
| 2016/0134619 A1* | 5/2016 | Mikheev | ............ | H04L 63/0884 |
| | | | | 726/8 |
| 2016/0150053 A1 | 5/2016 | Janczuk et al. | | |
| 2016/0197995 A1* | 7/2016 | Lu | ........................... | H04L 67/61 |
| | | | | 709/219 |
| 2017/0078384 A1* | 3/2017 | Trandafir | ............ | G06F 11/1451 |
| 2017/0176966 A1* | 6/2017 | Shin | ........................ | G06Q 10/06 |
| 2017/0329957 A1 | 11/2017 | Vepa et al. | | |
| 2017/0331832 A1* | 11/2017 | Lander | ................. | H04L 63/102 |
| 2018/0007059 A1* | 1/2018 | Innes | .................. | G06F 21/6218 |
| 2018/0115551 A1* | 4/2018 | Cole | .................... | H04L 47/783 |
| 2019/0068578 A1* | 2/2019 | Balakrishnan | ...... | H04L 63/0807 |

FOREIGN PATENT DOCUMENTS

| | | |
|---|---|---|
| CN | 105830388 A | 8/2016 |
| CN | 108322472 A | 7/2018 |
| KR | 10-1306442 B1 | 9/2013 |

OTHER PUBLICATIONS

Shehroze Farooqi et al., Measuring and Mitigating OAuth Access Token Abuse by Collusion Networks, Nov. 1, 2017, ACM, pp. 355-368. (Year: 2017).*

Dijiang Huang et al., Secure Data Processing Framework for Mobile Cloud Computing, Jun. 23, 2011, IEEE, pp. 1-5. (Year: 2011).*

Azeem Ahmad et al., A Multi-Token Authorization Strategy for Secure Mobile Cloud Computing, Jun. 16, 2014, IEEE, pp. 136-141. (Year: 2014).*

International Search report and Written Opinion of the Equivalent PCT/US2019/031424 issued Feb.7, 2020.

Extended Search Report issued in European Patent Application No. 19927802.9 dated Nov. 23, 2022, 6 pages.

International Preliminary Report on Patentability of International Patent Application No. PCT/US2019/031424 dated Nov. 18, 2021, 7 pages.

First Office Action issued in China Patent Application No. 2024013100050420 dated Jan. 31, 2024, 18 pages with English translation.

* cited by examiner

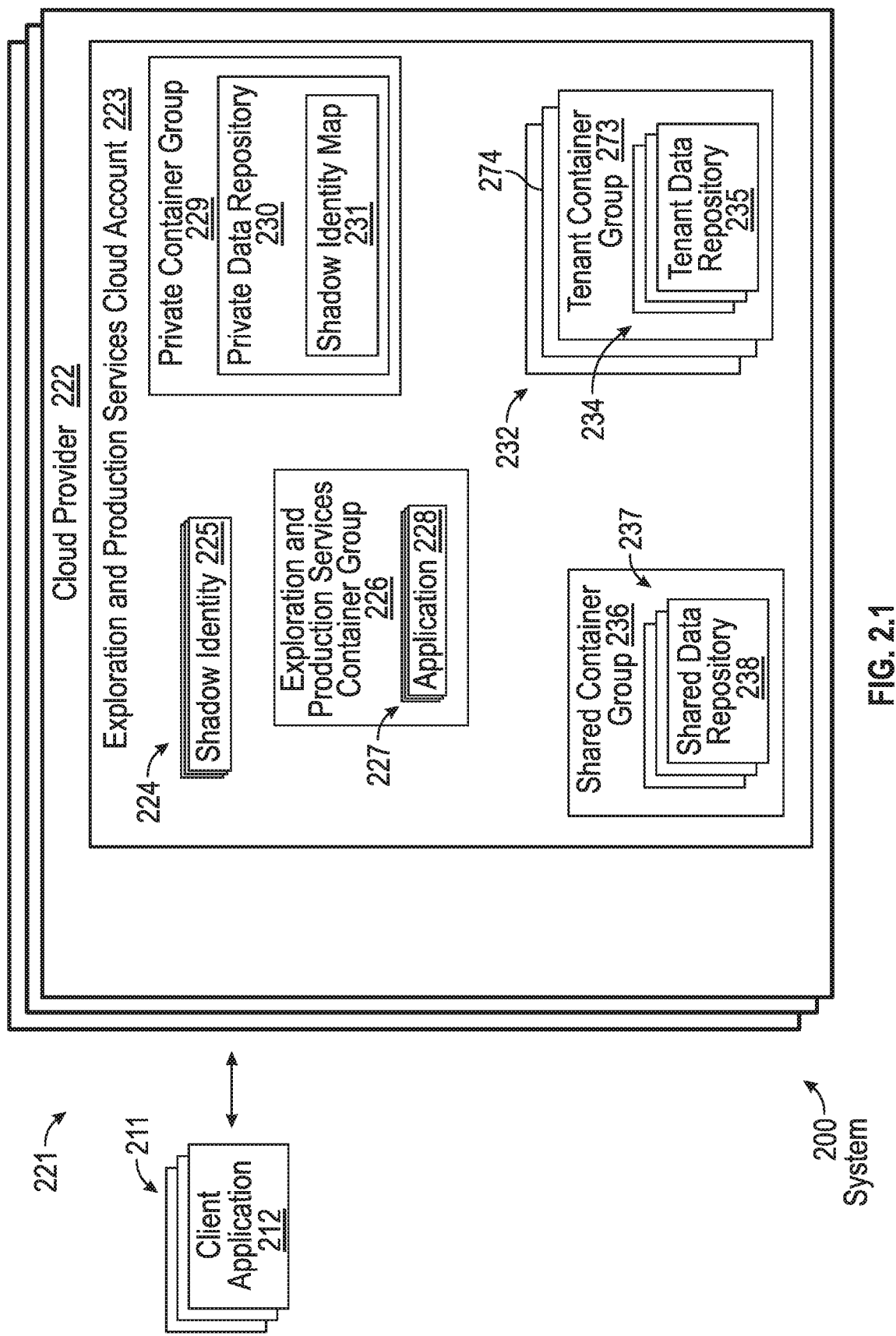
FIG. 2.1

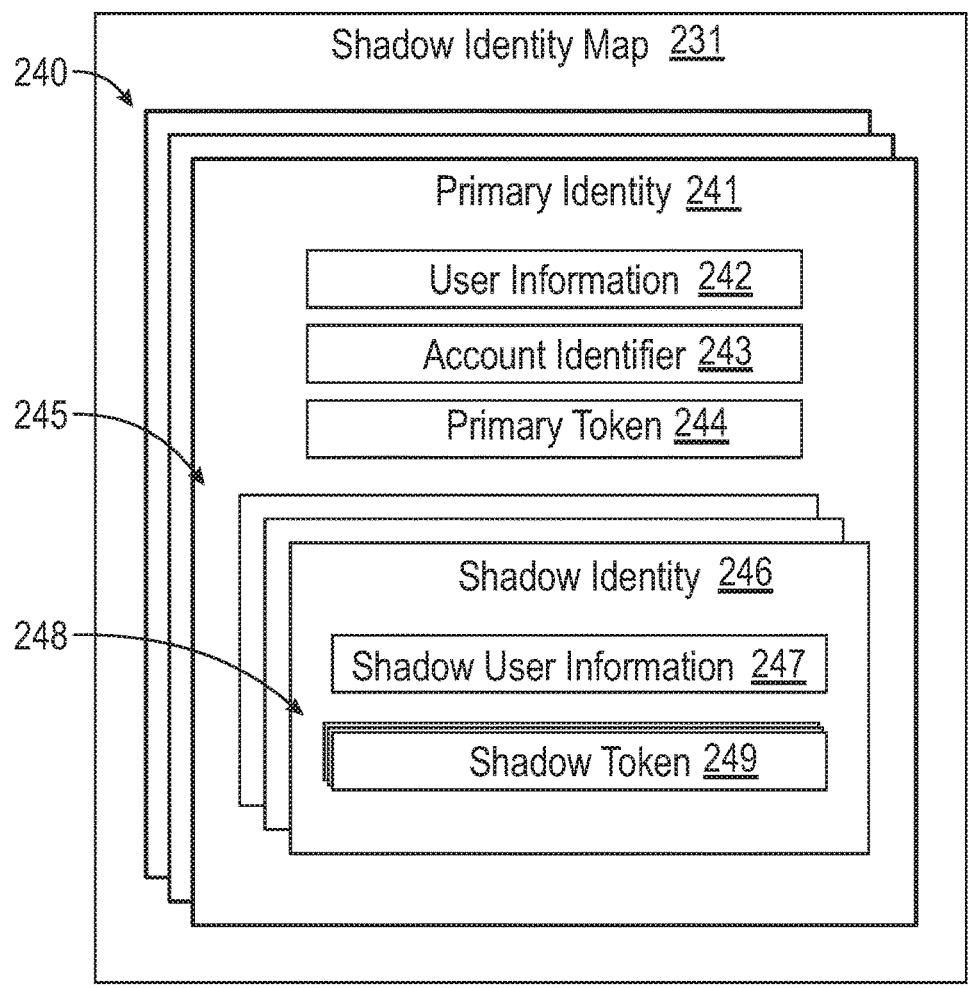
FIG. 2.2
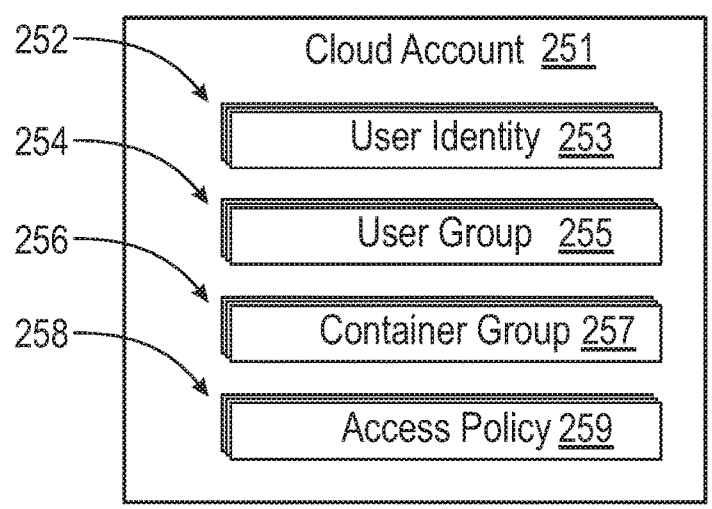
FIG. 2.3

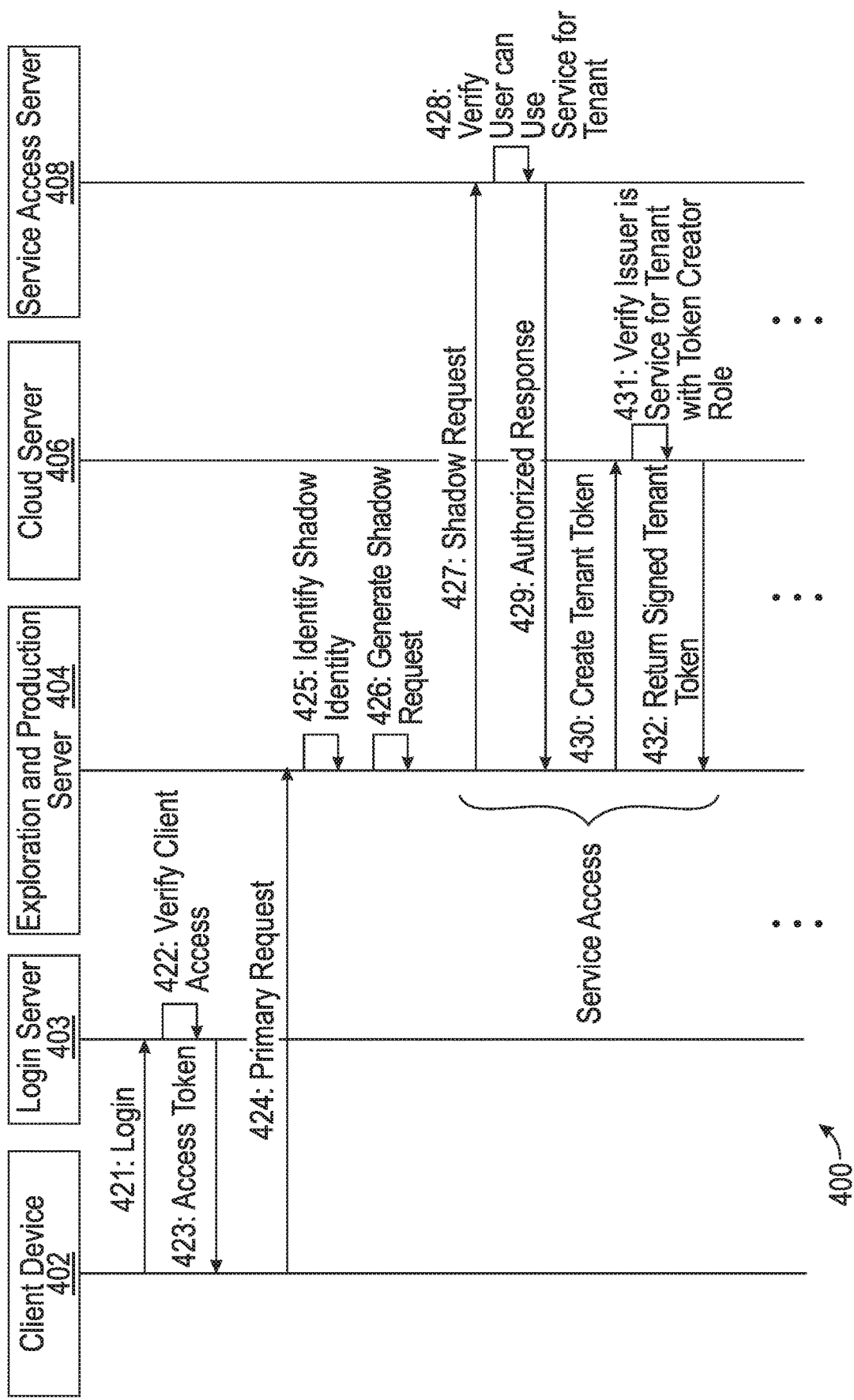
FIG. 4.1

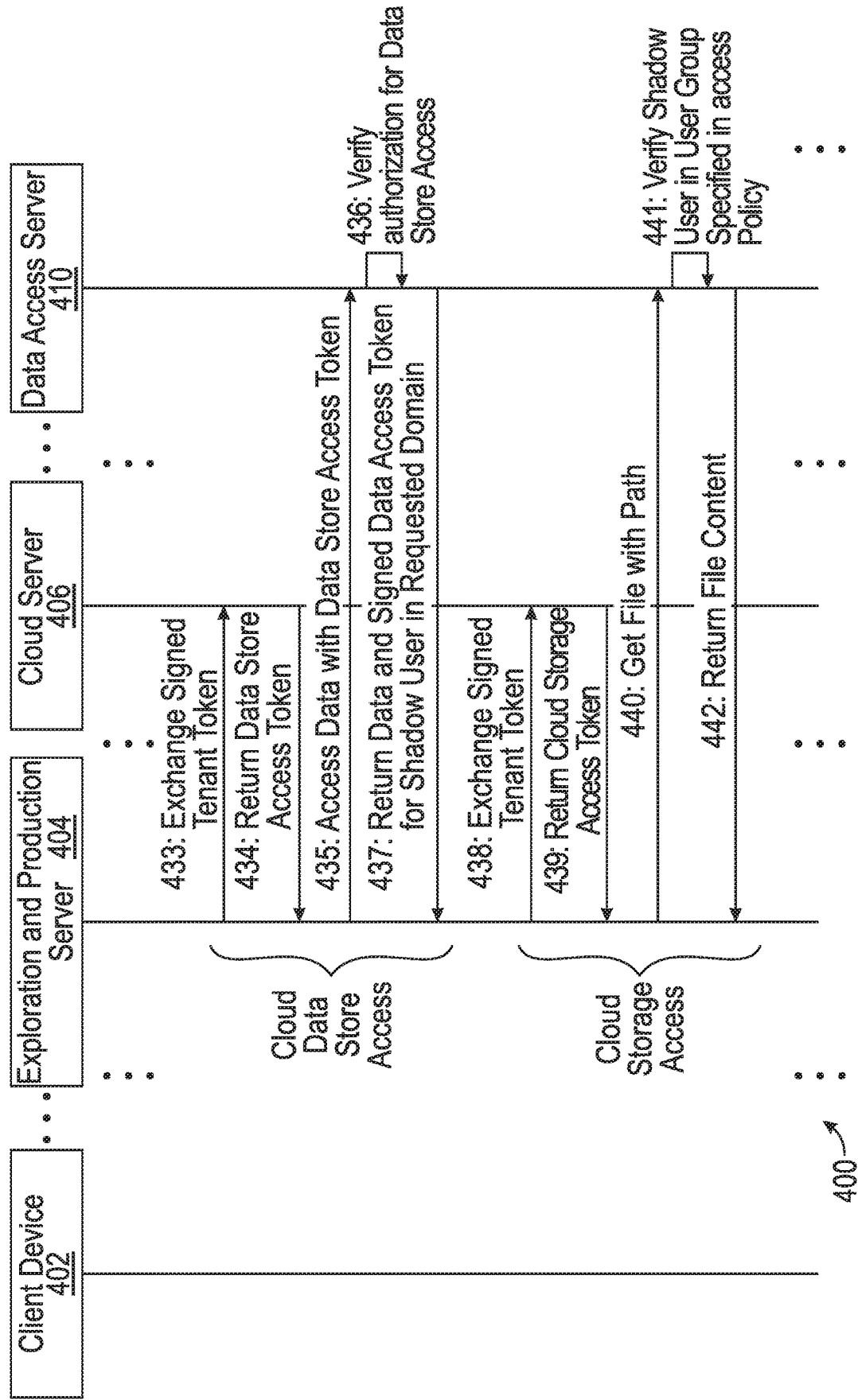
FIG. 4.2

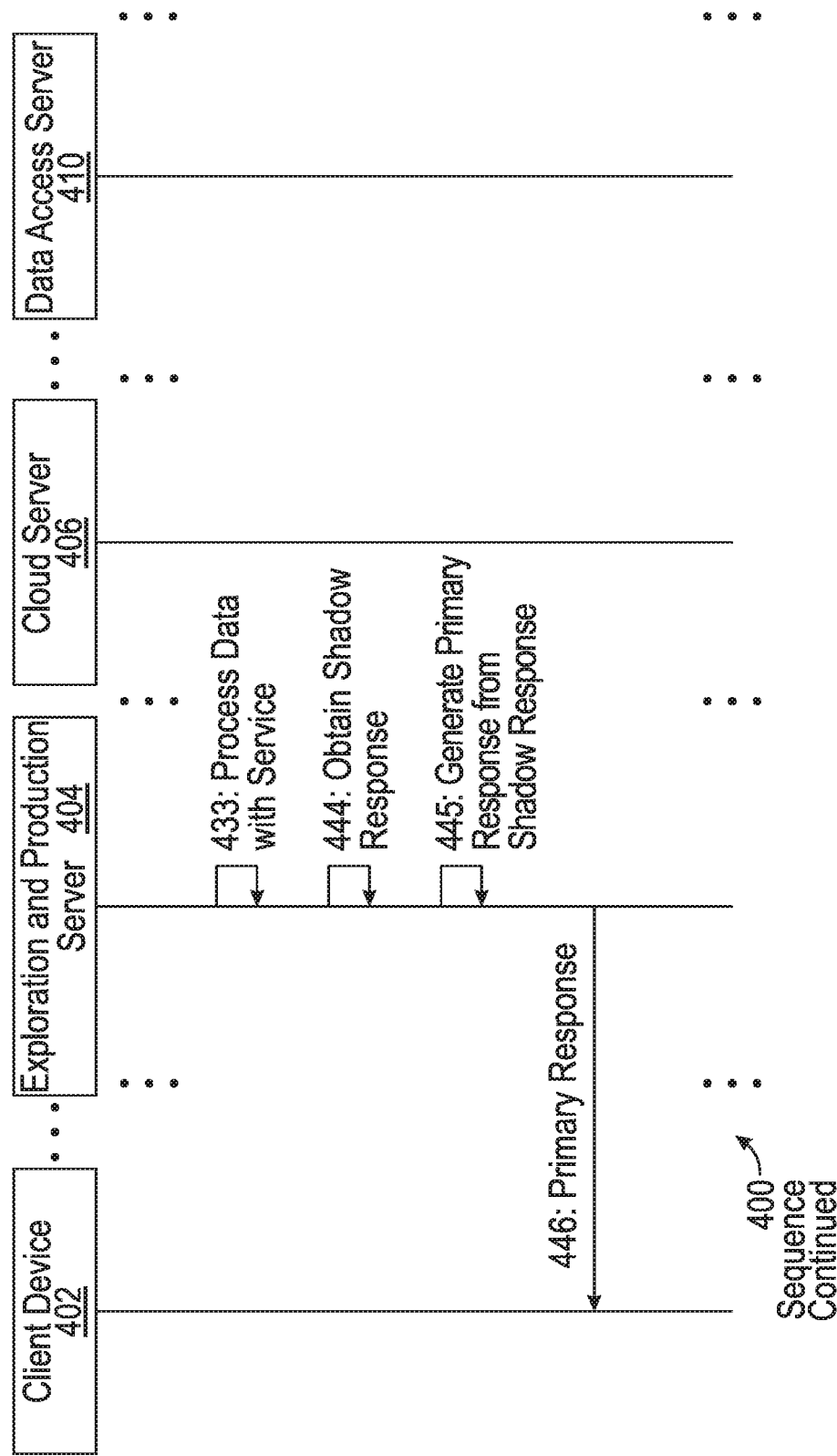
FIG. 4.3

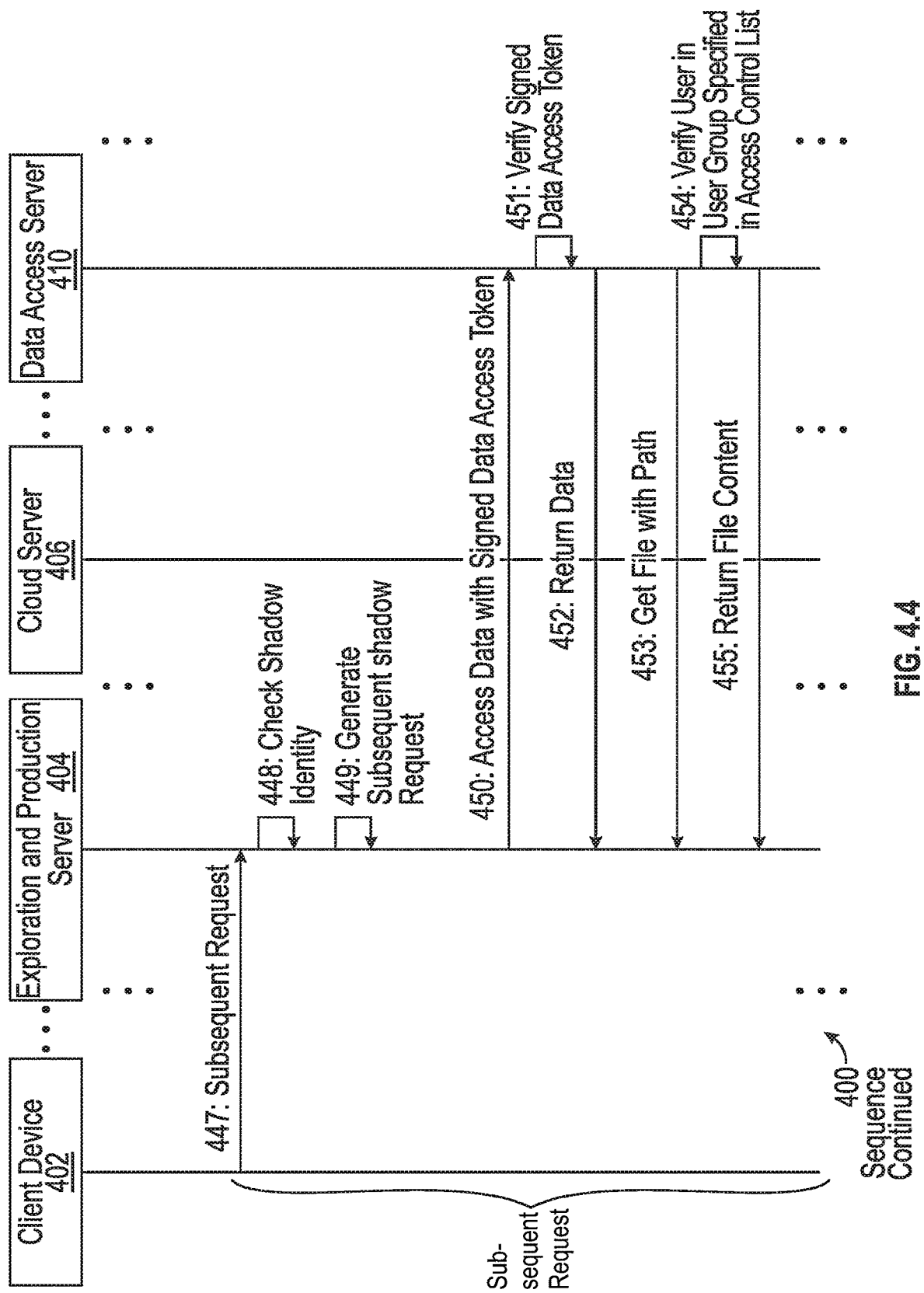
FIG. 4.4

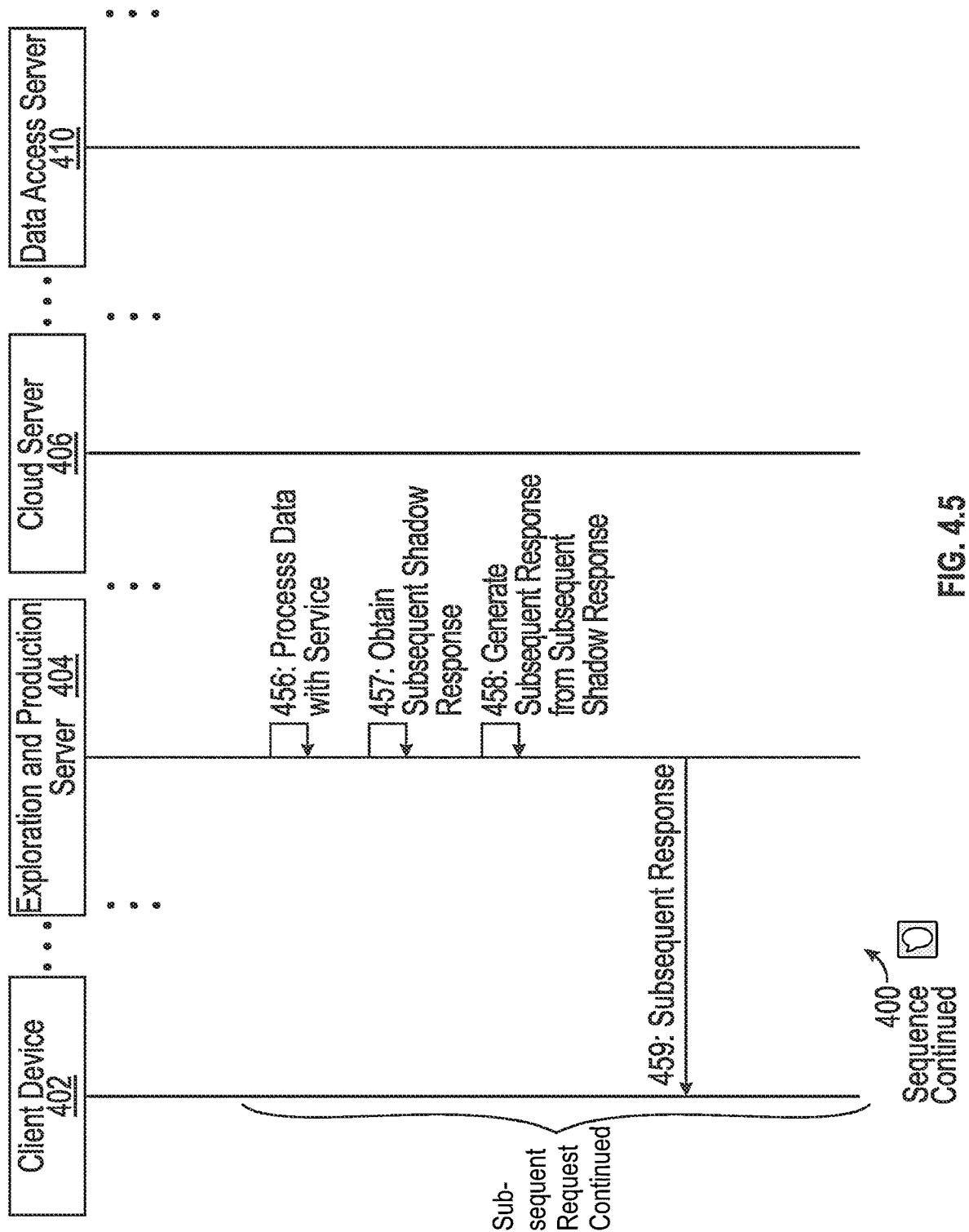
FIG. 4.5

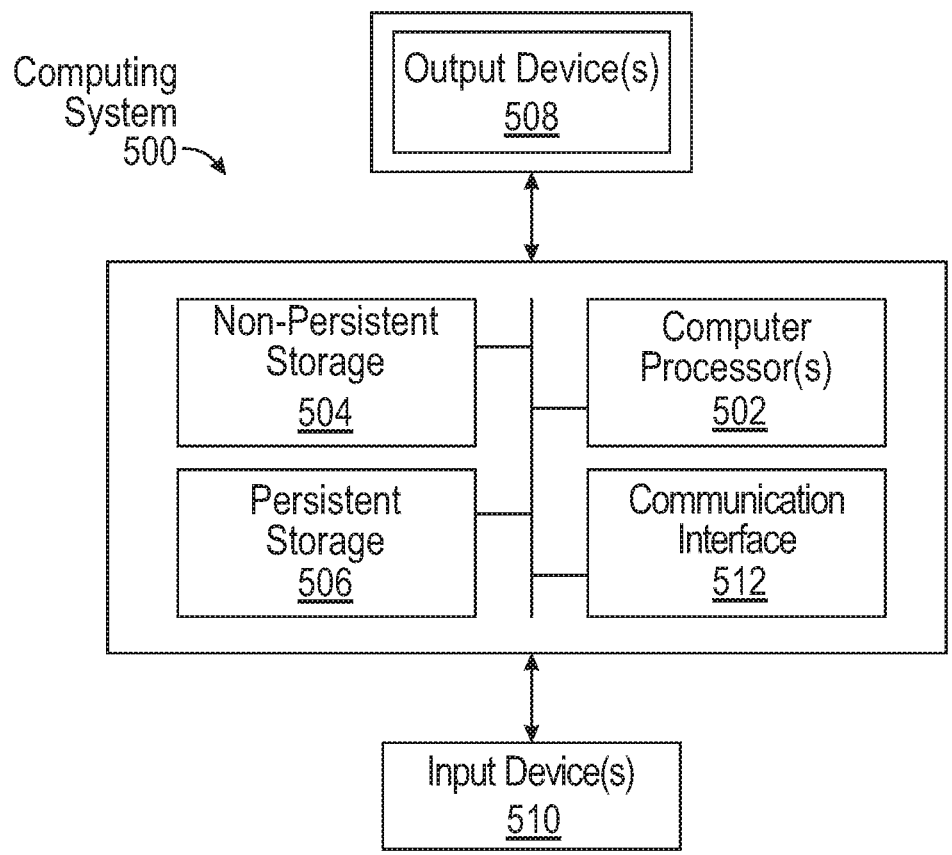
FIG. 5.1
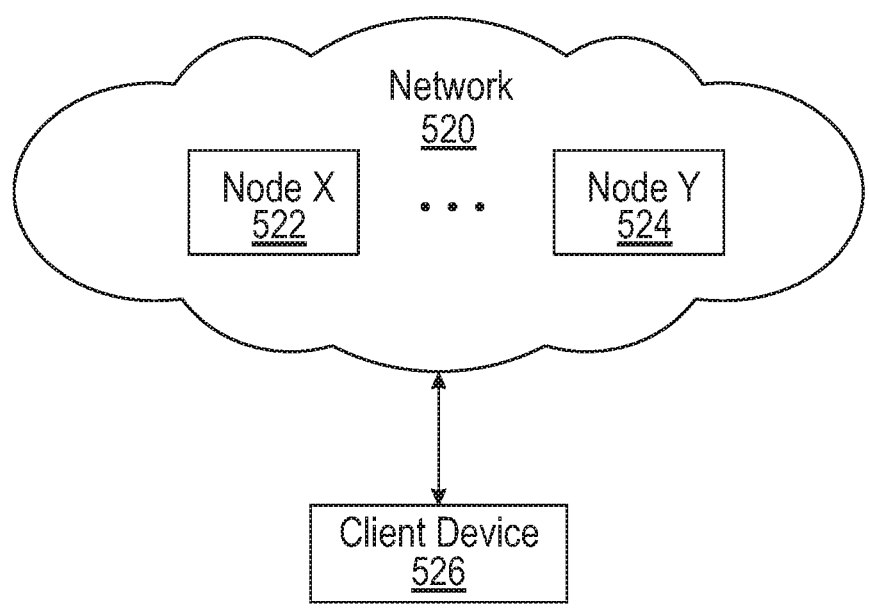
FIG. 5.2

CLIENT ISOLATION WITH NATIVE CLOUD FEATURES

CROSS-REFERENCE TO RELATED APPLICATIONS

This application is a U.S. National Stage Entry of International Application Number PCT/US2019/031424 filed May 9, 2019.

BACKGROUND

The clients of an exploration and production (E&P) services provider store proprietary data with the E&P services provider. The E&P services provider may have services and data storage hosted by the cloud provider. E&P services that are hosted by a cloud provider are provided to multiple clients of the E&P services provider. A challenge is to prevent individual clients from accessing the proprietary data of different clients while providing the clients access to the same E&P services.

SUMMARY

In general, in one or more aspects, the disclosure relates to client isolation with native cloud features. A primary request is received that includes a primary identity and is for a service that is provided by a services provider. The service is within a service container group project hosted by a cloud provider. A shadow request is generated from the primary request. The shadow request includes a shadow identity that is linked to the primary identity from the primary request. The shadow request is authorized by verifying that the shadow identity has access to the service. A tenant token is generated for the shadow identity in response to authorizing the shadow request. An access token is obtained using native authorization of the cloud provider in exchange for the tenant token. The access token provides the shadow identity with access to a tenant data repository of a tenant container group project of a set of tenant container groups projects hosted by the cloud provider. Tenant data is accessed from the tenant data repository using the access token. A shadow response is obtained that is generated for the shadow identity and includes processed tenant data generated by processing the tenant data from the tenant data repository with the service. A primary response is sent that is for the primary identity and is generated from the shadow response.

Other aspects of the disclosure will be apparent from the following description and the appended claims.

BRIEF DESCRIPTION OF DRAWINGS

FIGS. 2.1, 2.2, and 2.3 show diagrams of a system in accordance with disclosed embodiments.

FIGS. 4.1, 4.2, 4.3, 4.4, and 4.5 show an example in accordance with disclosed embodiments.

FIGS. 5.1 and 5.2 show computing systems in accordance with disclosed embodiments.

DETAILED DESCRIPTION

Figure 1:
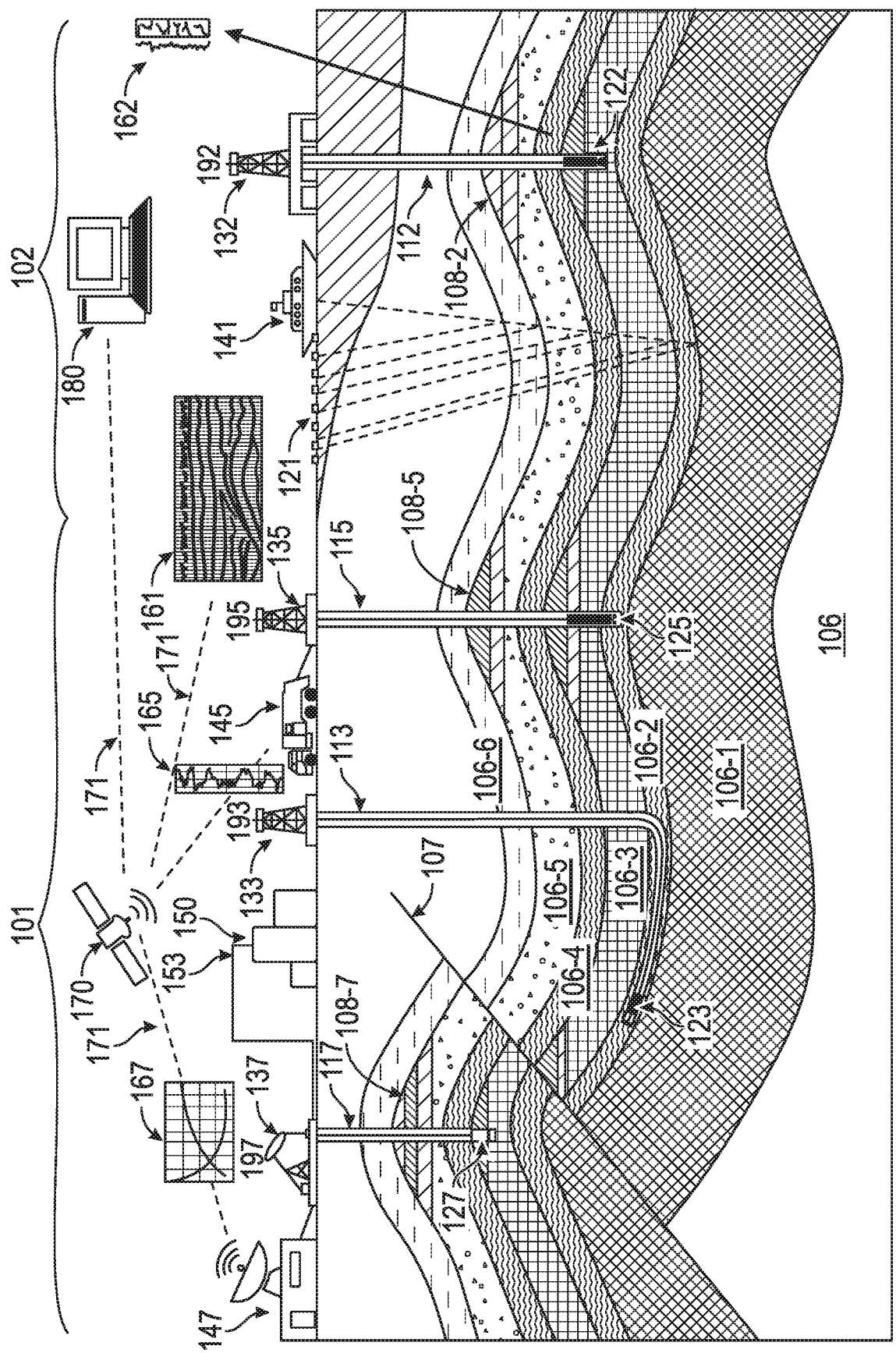
FIG. 1 shows a diagram of a system in accordance with disclosed embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to client access of exploration and production (E&P) services that are hosted with cloud providers. For example, a service may analyze proprietary client data using an artificial intelligence algorithm developed by the E&P services provider. An application (e.g., a web application or mobile app) running on a client device sends a primary request to a server of the E&P services provider. From the primary request, a shadow request may be generated by combining the payload of the primary request with a header that replaces the primary identity from the primary request with a shadow identity. The primary identity identifies the user of the application running on the client device to the E&P services provider and the E&P services provider uses the shadow identity, in lieu of the primary identity, to handle the primary request. The E&P services provider and the cloud providers generate tokens based on the shadow identity using the native authorization services, protocols, and application programming interfaces (APIs) of the cloud providers. The tokens are used to validate the requests made with the shadow identity to access the services and client proprietary data. Additionally, developers of the E&P services provider are prevented from accessing the client proprietary data since shadow identities are not generated for the developers of the E&P services provider in one or more embodiments.

FIG. 1 depicts a schematic view, partially in cross section, of an onshore field (101) and an offshore field (102) in which one or more embodiments may be implemented. In one or more embodiments, one or more of the modules and elements shown in FIG. 1 may be omitted, repeated, and/or substituted. Accordingly, embodiments should not be considered limited to the specific arrangement of modules shown in FIG. 1.

As shown in FIG. 1, the fields (101), (102) include a geologic sedimentary basin (106), wellsite systems (192), (193), (195), (197), wellbores (112), (113), (115), (117), data acquisition tools (121), (123), (125), (127), surface units (141), (145), (147), well rigs (132), (133), (135), production equipment (137), surface storage tanks (150), production pipelines (153), and an E&P computer system (180) connected to the data acquisition tools (121), (123), (125), (127), through communication links (171) managed by a communication relay (170).

The geologic sedimentary basin (106) contains subterranean formations. As shown in FIG. 1, the subterranean formations may include several geological layers (106-1 through 106-6). As shown, the formation may include a basement layer (106-1), one or more shale layers (106-2, 106-4, 106-6), a limestone layer (106-3), a sandstone layer (106-5), and any other geological layer. A fault plane (107) may extend through the formations. In particular, the geologic sedimentary basin includes rock formations and may include at least one reservoir including fluids, for example the sandstone layer (106-5). In one or more embodiments, the rock formations include at least one seal rock, for example, the shale layer (106-6), which may act as a top seal. In one or more embodiments, the rock formations may include at least one source rock, for example the shale layer (106-4), which may act as a hydrocarbon generation source. The geologic sedimentary basin (106) may further contain hydrocarbon or other fluids accumulations associated with certain features of the subsurface formations. For example, accumulations (108-2), (108-5), and (108-7) associated with structural high areas of the reservoir layer (106-5) and containing gas, oil, water or any combination of these fluids.

In one or more embodiments, data acquisition tools (121), (123), (125), and (127), are positioned at various locations along the field (101) or field (102) for collecting data from the subterranean formations of the geologic sedimentary basin (106), referred to as survey or logging operations. In particular, various data acquisition tools are adapted to measure the formation and detect the physical properties of the rocks, subsurface formations, fluids contained within the rock matrix and the geological structures of the formation. For example, data plots (161), (162), (165), and (167) are depicted along the fields (101) and (102) to demonstrate the data generated by the data acquisition tools. Specifically, the static data plot (161) is a seismic two-way response time. Static data plot (162) is core sample data measured from a core sample of any of subterranean formations (106-1 to 106-6). Static data plot (165) is a logging trace, referred to as a well log. Production decline curve or graph (167) is a dynamic data plot of the fluid flow rate over time. Other data may also be collected, such as historical data, analyst user inputs, economic information, and/or other measurement data and other parameters of interest.

The acquisition of data shown in FIG. 1 may be performed at various stages of planning a well. For example, during early exploration stages, seismic data (161) may be gathered from the surface to identify possible locations of hydrocarbons. The seismic data may be gathered using a seismic source that generates a controlled amount of seismic energy. In other words, the seismic source and corresponding sensors (121) are an example of a data acquisition tool. An example of seismic data acquisition tool is a seismic acquisition vessel (141) that generates and sends seismic waves below the surface of the earth. Sensors (121) and other equipment located at the field may include functionality to detect the resulting raw seismic signal and transmit raw seismic data to a surface unit (141). The resulting raw seismic data may include effects of seismic wave reflecting from the subterranean formations (106-1 to 106-6).

After gathering the seismic data and analyzing the seismic data, additional data acquisition tools may be employed to gather additional data. Data acquisition may be performed at various stages in the process. The data acquisition and corresponding analysis may be used to determine where and how to perform drilling, production, and completion operations to gather downhole hydrocarbons from the field. Generally, survey operations, wellbore operations and production operations are referred to as field operations of the field (101) or (102). These field operations may be performed as directed by the surface units (141), (145), (147). For example, the field operation equipment may be controlled by a field operation control signal that is sent from the surface unit.

Further as shown in FIG. 1, the fields (101) and (102) include one or more wellsite systems (192), (193), (195), and (197). A wellsite system is associated with a rig or a production equipment, a wellbore, and other wellsite equipment configured to perform wellbore operations, such as logging, drilling, fracturing, production, or other applicable operations. For example, the wellsite system (192) is associated with a rig (132), a wellbore (112), and drilling equipment to perform drilling operation (122). In one or more embodiments, a wellsite system may be connected to a production equipment. For example, the well system (197) is connected to the surface storage tank (150) through the fluids transport pipeline (153).

In one or more embodiments, the surface units (141), (145), and (147), are operatively coupled to the data acquisition tools (121), (123), (125), (127), and/or the wellsite systems (192), (193), (195), and (197). In particular, the surface unit is configured to send commands to the data acquisition tools and/or the wellsite systems and to receive data therefrom. In one or more embodiments, the surface units may be located at the wellsite system and/or remote locations. The surface units may be provided with computer facilities (e.g., an E&P computer system) for receiving, storing, processing, and/or analyzing data from the data acquisition tools, the wellsite systems, and/or other parts of the field (101) or (102). The surface unit may also be provided with, or have functionality for actuating, mechanisms of the wellsite system components. The surface unit may then send command signals to the wellsite system components in response to data received, stored, processed, and/or analyzed, for example, to control and/or optimize various field operations described above.

In one or more embodiments, the surface units (141), (145), and (147) are communicatively coupled to the E&P computer system (180) via the communication links (171). In one or more embodiments, the communication between the surface units and the E&P computer system may be managed through a communication relay (170). For example, a satellite, tower antenna or any other type of communication relay may be used to gather data from multiple surface units and transfer the data to a remote E&P computer system for further analysis. Generally, the E&P computer system is configured to analyze, model, control, optimize, or perform management tasks of the aforementioned field operations based on the data provided from the surface unit. In one or more embodiments, the E&P computer system (180) is provided with functionality for manipulating and analyzing the data, such as analyzing seismic data to determine locations of hydrocarbons in the geologic sedimentary basin (106) or performing simulation, planning, and optimization of E&P operations of the wellsite system. In one or more embodiments, the results generated by the E&P computer system may be displayed for user to view the results in a two-dimensional (2D) display, three-dimensional (3D) display, or other suitable displays. Although the surface units are shown as separate from the E&P computer system in FIG. 1, in other examples, the surface unit and the E&P computer system may also be combined.

In one or more embodiments, the E&P computer system (180) is implemented by an E&P services provider by deploying applications with a cloud based infrastructure. As an example, the applications may include a web application that is implemented and deployed on the cloud and is accessible from a browser. Users (e.g., external clients of third parties and internal clients of the E&P services provider) may log into the applications and execute the functionality provided by the applications to analyze and interpret data, including the data from the surface units (141), (145), and (147). The E&P computer system and/or surface unit may correspond to a computing system, such as the computing system shown in FIGS. 5.1 and 5.2 and described below.

FIGS. 2.1, 2.2, and 2.3 show diagrams of one or more embodiments that are in accordance with the disclosure. The various elements, systems, and components shown in FIGS. 2.1, 2.2, and 2.3 may be omitted, repeated, combined, and/or altered as shown from FIGS. 2.1, 2.2, and 2.3. Accordingly, the scope of the present disclosure should not be considered limited to the specific arrangements shown in FIGS. 2.1, 2.2, and 2.3.

Referring to FIG. 2.1, the system (200) provides client isolation using native cloud features. The system (200) includes the cloud providers (221) and the client applications (211).

The cloud providers (221) deliver cloud computing based services and solutions to businesses and individuals to store data and run computing applications on server computers. The server computers are described below in FIGS. 5.1 and 5.2. The services and solutions may include hardware, software, infrastructure, etc. that is virtual or physical. In one or more embodiments, customers access cloud resources through the Internet and are billed for resources and services used according to a subscribed billing method. Cloud providers may provide various solutions, including: infrastructure as a service (IaaS), Platform as a service (PaaS), software as a service (SaaS), backend as a service (BaaS), serverless computing, function as a service (FaaS), etc. Examples of cloud providers (221) include Amazon Web Services® (AWS), Google Cloud™ Platform (GCP), Microsoft Azure™, Oracle Cloud®, etc. Amazon Web Services® is a registered trademark of Amazon Technologies, Inc. located in Seattle, Washington; Google Cloud™ is a registered trademark of Google LLC, located in Mountain View, California. Azure™ is a registered trademark of Microsoft Corporation, located in Redmond, Washington; and Oracle Cloud® is a registered trademark of Oracle International Corporation located in Redwood City, California.

Infrastructure as a service solutions deploy and run arbitrary software, including operating systems and applications, without managing or controlling the underlying cloud infrastructure by the developer. Control may be maintained over operating systems, storage, and deployed applications and limited control may be provided for select networking components (e.g., host firewalls).

Platform as a service solutions deploy applications created using programming languages, libraries, services, and tools supported by the cloud provider. The developer does not manage or control the underlying cloud infrastructure including network, servers, operating systems, or storage, but may have control over the deployed applications and configuration settings for the application-hosting environment.

Software as a service solutions deploy on-demand software using applications running on a cloud infrastructure without managing the underlying cloud infrastructure including network, servers, operating systems, and storage by the developer.

Backend as a service solutions link web and mobile applications to cloud storage and cloud computing services with application programming interfaces (APIs) and software development kits (SDKs) to provide services including: user management, push notifications, integration with social networking services, etc.

Serverless computing is a cloud computing code execution model in which the cloud provider manages starting and stopping virtual machines to serve requests. In serverless computing, requests are billed by a measure of the resources used to satisfy the request, rather than per virtual machine, per hour, which may be used for the other cloud service solutions.

Function as a service (FaaS) solutions deploy service-hosted remote procedure calls that leverage serverless computing to enable the deployment of individual functions in the cloud that run in response to events.

The client applications (211) are programs operated by the clients of the E&P services provider. Examples of the client applications (211) include browser applications and web services that access representational state transfer application programming interfaces (RESTful APIs) exposed by the application (228). The client applications (211) include the client application (212). In one or more embodiments, the client application (212) generates requests to process data stored in the tenant data repository (235) of the tenant container group (273) that is to be processed by the application (228) of the E&P services container group (226).

The cloud providers (221) include the cloud provider (222). The cloud provider (222) includes the E&P services cloud account (223). Additional description of cloud accounts are provided with FIG. 2.3.

The E&P services cloud account (223) is an account hosted by the cloud provider (222). In one or more embodiments, the E&P services cloud account (223) is used by an E&P services provider to provide a secure cloud-based environment to the clients of the E&P services provider for analyzing E&P data. The E&P services cloud account (223) includes the shadow identities (224) and a set of container groups that includes the E&P services container group (226), the private container group (229), the tenant container groups (232), and the shared container group (236).

The container groups of the services cloud account (223) include containers of resources that are logically isolated. The resources of a first container group are logically isolated and separate from the resources of a second container group. The programs and data within one container group cannot use the resources of another container group even though the different container groups may share the same physical resources (storage devices, processors, servers, etc.). Different access permissions are used for the different container groups so that an application with access permission to one container group may not have access to the other container groups. For example, a customer of the E&P services provider may have access to the tenant container group (273) but may not have access to the tenant container group (274) due to the access permission restraints and the logical separation of the resources that are used by the tenant container group (273) and the tenant container group (274). As examples, a container group may be implemented with a project when using Google Cloud™ Platform (GCP) tools and a container group may be implemented with a subscription when using Microsoft Azure™ tools.

The shadow identities (224) are identities created in the E&P services cloud account (223) that are used in place of the primary identities received in requests from the client applications (221). Identities identify a user that triggered a request and, in one or more embodiments, include an email address. Shadow identities are further described in FIG. 2.2. The shadow identities (224) include the shadow identity (225), which is used to handle request from the client application (212).

The E&P services container group (226) includes the computing resources hosted by the cloud provider (222) that are used to handle the requests of the client applications (211). The E&P services container group (226) includes the applications (227).

The applications (227) are programs running on the servers of the cloud provider (222). In one or more embodiments, the applications (227) include services for analyzing data that includes E&P data and is stored in one or more of the tenant container groups (232) and the shared container group (236). The applications (227) include the application (228), which handles a request from the client application (212).

The private container group (229) includes a collection of resources available to the E&P services provider and are not available to the clients of the E&P services provider. In one or more embodiments, the private container group (229) includes the private data repository (230).

The private data repository (230) includes data that is not accessible to the clients of the E&P services provider. In one or more embodiments, the private data repository (230) includes the shadow identity map (231).

The shadow identity map is a map that links primary identities from requests from the client applications (211) to the shadow identities (224). The shadow identity map is further described with FIG. 2.2.

The tenant container groups (232) are collections of resources that are accessible to specific clients of the E&P services provider. In one or more embodiments, a client with access to a first tenant container group does not have access to the other tenant container groups. Because of the lack of access, clients of the E&P services provider that are also competitors may use the services hosted on the cloud provider (222) in a secure manner that prevents the clients from accessing the resources of their competitors. The tenant container groups (232) include the tenant container group (273) and the tenant container group (274).

In one or more embodiments, the tenant container group (273) includes resources for which access is requested by the client application (212). The tenant container group (273) includes the tenant data repositories (234).

The tenant data repositories (234) are data storage services and, in one or more embodiments, include database and file storage services. For example, a client of the E&P services provider stores data in a tenant data repository that includes well data, field data, reservoir data obtained by various means (e.g., wireline logging, logging while drilling, seismic exploration, simulation, modeling and interpretation) related to exploration, drilling, production, oilfield domain data, etc. The tenant data repositories (234) include the tenant data repository (235). In one or more embodiments, the tenant data repository (235) performs data storage and retrieval for the client application (212).

The shared container group (236) is a container group that a collection of clients may access and which includes data provided by the E&P services provider. The shared container group (236) includes the shared data repositories (237), which include the shared data repository (238). The shared data repositories (237) store data in one or more databases and file systems and includes data, such as data from public sources, released data owned by the E&P service provider, or data that is not private to any customer and the E&P service provider either owns or has a license allowing the E&P service provider to offer the data to various customers.

Referring to FIG. 2.2, the shadow identity map (231) links primary identities to shadow identities. The shadow identity map (231) includes the primary identities (240). In one or more embodiments, the shadow identity map (231) links the primary identities (240) with the shadow identities (245) for the cloud providers (222). In additional or alternative embodiments, a plurality of shadow identity maps are provided with a one-to-one ratio between the number of shadow identity maps and the number of cloud providers.

The primary identities (240) are the identities used by the client applications (211) to request services from the E&P services container group (226). The primary identities (240) include the primary identity (241).

The primary identity (241) includes the user information (242), account identifier (243), the primary token (244), and the shadow identities (245). In one or more embodiments, the primary identity (241) is the identity used by the client application (212) to access the application (228) of the E&P services container group (226).

The user information (242) includes information about the user associated with the primary identity (241). For example, the user information (242) may include a username, password, first name, last name, organization name, title, role, address, phone number, etc.

The account identifier (243) identifies the account that the client maintains with the E&P services provider, which is used to access the services provided by the applications (227).

The primary token (244) is a token issued to the primary identity (241) to authorize access by the primary identity (241) to the applications (227) of the E&P services container group (226). In one or more embodiments, the primary token (244) is a string of characters that denote a specific scope, lifetime, and other access attributes in the form of a JavaScript object notation (JSON) web token (JWT).

The shadow identities (245) are a set of user identities that have been assigned to the primary identity (241). The shadow identities (245) include the shadow identity (246). In one or more embodiments, the shadow identity (246) is the user identity (253) of FIG. 2.3. There is no actual person directly using shadow user identity and the E&P service provider and its employees cannot use the shadow identities.

The shadow user information (247) includes account identifiers of a shadow user created for the primary identity (241) for access to the application (228). In one or more embodiments, the shadow user information (247) is an email address that uses the domain name of the cloud provider (222) with a local part prefix that is assigned to the primary identity (241).

The shadow tokens (248) are a set of tokens generated for the shadow identity for accessing to the applications (227), the tenant data repositories (234), and the shared data repositories (237). In one or more embodiments, the shadow tokens (248) are JavaScript object notation (JSON) web tokens (JWTs). The shadow tokens (248) include the shadow token (249), which is used to access the tenant data repository (235).

Referring to FIG. 2.3, the cloud account (251) is a collection of identities, user groups, container groups, and access policies that are used by a customer of the cloud provider to develop and execute applications using the infrastructure and services provided by the cloud provider. The cloud account (251) includes the user identities (252), the user groups (254), the container groups (256), and the access policies (258)

The user identities (252) enumerate and distinguish the different users of the cloud account (251). The user identities (252) include the user identity (253). In one or more embodiments, the user identity (253) includes user information (e.g., username, password, and contact information) of the user associated with the user identity (253). In one or more embodiments, user identities are linked to roles that serve as a basis for determining whether a user may access a resource.

The user groups (254) are collections of user identities. The user groups (254) include the user group (255). In one or more embodiments, the user group (255) includes the user identity (253).

The container groups (256) are collections of computing resources provided or hosted by the cloud provider, which may be used by the users identified with the user identities (252). The container groups (256) include the container group (257). In one or more embodiments, the container group (257) includes applications, application programming interfaces, data stores, data storage, etc.

The access policies (258) control the access to the resources in the container groups (256), which may be on an individual basis, a user group basis, a container group basis, etc. The access policies (258) include the access policy (259). In one or more embodiments, the access policy (259) identifies that the user group (255), which includes the user identity (253), has access to the resources of the container group (257).

Figure 3:
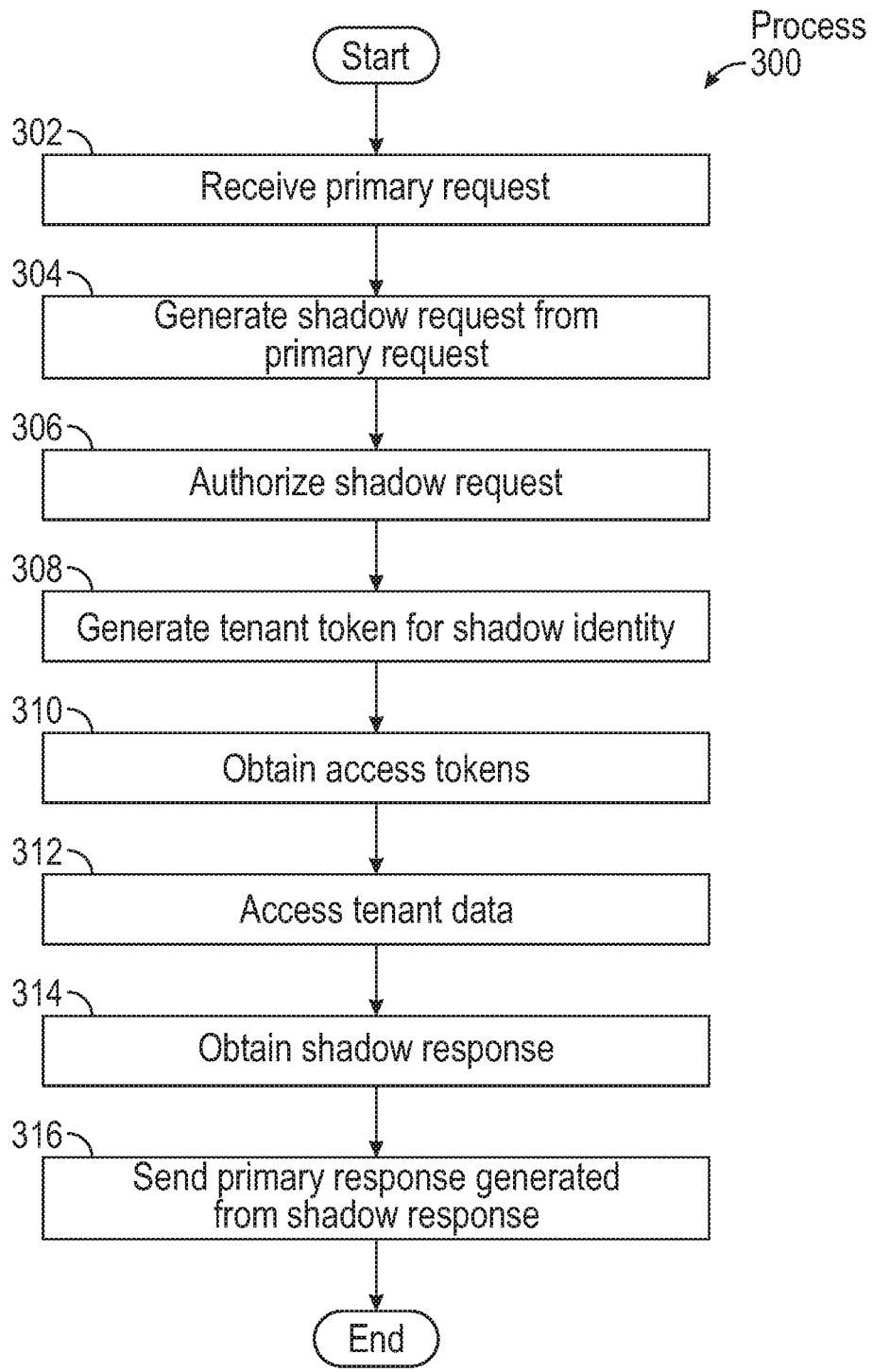
FIG. 3 shows a flowchart in accordance with disclosed embodiments.

FIG. 3 shows a flowchart in accordance with one or more embodiments of the disclosure. While the various blocks in the flowchart are presented and described sequentially, one of ordinary skill will appreciate that at least some of the blocks may be executed in different orders, may be combined or omitted, and at least some of the blocks may be executed in parallel. Furthermore, the blocks may be performed actively or passively. For example, some blocks may be performed using polling or be interrupt driven in accordance with one or more embodiments. By way of an example, determination blocks may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

Turning to FIG. 3, FIG. 3 shows a flowchart in accordance with one or more embodiments of the disclosure. In Block 302, a primary request is received. In one or more embodiments, the primary request is sent by a client application and received by service provided by the E&P services provider that is hosted by the cloud provider. In one or more embodiments, the primary request identifies a service to be executed using tenant data hosted on the cloud provider. The primary request may be a hypertext transfer protocol (HTTP) request; a remote procedure call (RPC); a create, read, update, or delete (CRUD) operation (e.g., using HTTP POST, GET, PUT, or DELETE requests); etc. In one or more embodiments, the primary request includes a primary token, an email address, and an account identifier. The primary request may be part of a RESTful API call to an application of an E&P server.

The primary token is provided to the client application after the client application logged into the system. The primary token is used to authorize access to the requested service using an authorization process created by the E&P services provider to control access to the services of the E&P services provider that are hosted by the cloud provider.

The email address is the address of the user for which the client application is operating, is the primary identity used by the client application, is known to the E&P services provider, and is not used by the cloud provider when authorizing access to the resources of the E&P services provider that are hosted by the cloud provider. For example, a client application may provide the email address "primary-user@client-domain.name", which includes the local-part "primary-user" and the domain "client-domain.name".

The account identifier identifies the user account with the E&P services provider. The account identifier in the primary request is different from the account identifiers used by the E&P services provider to identify the accounts of the E&P services provider that are hosted by the cloud providers to provide services to the client applications.

In Block 304, a shadow request is generated from the primary request. In one or more embodiments, one or more of the primary token, username, and account identifier are replaced with a respective token, username, and account identifier associated with a shadow identity. In one or more embodiments, the shadow identity is created for the primary identity when the primary identity is created, i.e., when the third party sets up an account with the E&P services provider. In additional or alternative embodiments, the shadow identity is created on demand in response to receipt of the primary request.

In Block 306, the shadow request is authorized. In one or more embodiments, the shadow request is authorized using the native authorization process used by the cloud provider. The cloud provider verifies that the shadow username is linked with a role and user group that are specified in an access policy as having access rights for the service that is being requested with the shadow request.

In Block 308, a tenant token is generated for the shadow identity. In one or more embodiments, the tenant token is an authoritative credential that can be used to access the service. Subsequent requests by the same user for the same service may use the tenant token without having to redo the verification process.

In Block 310, access tokens are obtained. In one or more embodiments, the access tokens are generated by the native authorization process of the cloud provider in response to a request to access data hosted by the cloud provider. In order to perform the service requested by the shadow request, data from the tenant data repositories or from the shared data repositories may be utilized. The data is stored in different container groups with different access rights and use different tokens for the different container groups and data access processes. For example, a data store access token may be used for data within a data store (e.g., records in a database) and a data storage access token may be used for data within a file system (e.g., data stored in files on physical storage mediums).

In Block, 312, tenant data is accessed. In one or more embodiments, the tenant data is accessed to retrieve the data used to generate a response to the shadow request, referred to as a shadow response. In additional and alternative embodiments, shared data may also be accessed for handling the shadow request.

In Block 314, a shadow response is obtained. In one or more embodiments, the shadow response includes output generated by the service after executing on the tenant data. In one or more embodiments, the shadow response is a response to the shadow request for the shadow identity and includes data that is included in a primary response to the primary request for the primary identity.

In Block 316, a primary response generated from the shadow response is sent. In one or more embodiments, generating the primary response removes references to the shadow identity, which are replaced with references to the primary identity that is linked to the shadow identity. In one or more embodiments, generating the primary response removes tokens generated for the shadow identity.

FIGS. 4.1, 4.2, 4.3, 4.4, and 4.5 show a sequence diagram in accordance with one or more embodiments of the disclosure. While the various processes described in the sequence diagram are presented and described sequentially, one of ordinary skill will appreciate that at least some of the processes may be executed in different orders, may be combined or omitted, and at least some of the processes may be executed in parallel. Furthermore, the processes may be performed actively or passively. For example, some processes may be performed using polling or be interrupt driven in accordance with one or more embodiments. By way of an example, determination processes may not have a processor process an instruction unless an interrupt is received to signify that condition exists in accordance with one or more embodiments. As another example, determinations may be performed by performing a test, such as checking a data value to test whether the value is consistent with the tested condition in accordance with one or more embodiments.

The various elements, systems, and components shown in FIGS. 4.1, 4.2, 4.3, 4.4, and 4.5 may be omitted, repeated, combined, and/or altered as shown from FIGS. 4.1, 4.2, 4.3, 4.4, and 4.5. Accordingly, the scope of the present disclosure should not be considered limited to the specific arrangements shown in FIGS. 4.1, 4.2, 4.3, 4.4, and 4.5. The components performing the sequence (400) include the client device (402), the login server (403), the E&P server (404), the cloud server (406), the service access server (408), and the data access server (410), which are computing systems in accordance with the systems described in FIGS. 1, 2.1, 5.1, and 5.2.

The client device (402) is a physical or virtual computing device running a client application. The client device (402) accesses the services provided by the E&P services provider.

The login server (403) is a set of physical or virtual computing devices that run the programs for logging in. The login server (403) is used by the client device to login to the systems and services of the E&P services provider.

The E&P server (404) is a set of physical or virtual computing devices that run the programs that provide the services offered by the E&P services provider to third parties clients. In one or more embodiments, E&P server (404) is hosted by the cloud provider.

The cloud server (406) is a set of physical or virtual computing devices that run the programs that provide the cloud services offered by the cloud provider to the E&P services provider. In one or more embodiments, the cloud provider may host multiple servers for multiple parties that are logically separated. For example, the cloud provider may host the login server and the E&P server as well as the cloud server, the service access server, and the data access server.

The server access server (408) is a set of physical or virtual computing devices that run the programs that control access to the services hosted by the cloud provider. Multiple services may be provided with different services utilizing different specific users, user groups, roles, and privileges as specified in the access policies of the services.

The data access server (410) is a set of physical or virtual computing devices that run the programs that control access to the data stored and hosted by the cloud provider. The data includes shared data stored in shared repositories in shared container groups and client proprietary data stored in tenant repositories of tenant container groups.

Turning to FIG. 4.1, at 421, login information is transmitted. In one or more embodiments, the login information is provided by a client application and includes a username and password for a primary identity. In one or more embodiments, the client device logs in using the login server.

At 422, access by the client device is verified. In one or more embodiments, the login server verifies the username and password from the login information and matches the login information to a valid client account maintained by the E&P services provider. The client account with the E&P services provider is used to access specific E&P services, shared data, and tenant data based on the level of access specified in the client account.

At 423, a primary token in the form of an access token is passed back to the client device. In one or more embodiments, the access token is a JSON web token, the validation of which provides access to the services of the E&P services provider. As an example, a JSON web token with the header:
{"alg":"HS (256)", "typ":"JWT"} and the payload:

{"username":"primary-user@client-domain.name",
"accountid":2389921386} that is encoded with the secret "primary-identity-secret" is encoded in base64url forms the token:

eyJhbGciOiJIUzI1NiIsInR5cCI6IkpXVCJ9.eyJ1c2VybmFtZSI
6InByaW1hcnktdXNlckBjbGllbnQtZG9tYWluLm5hbWUiLCJhY2N
vdW50aWQiOjIzODk5MjEzODZ9.1nKSytI-UHlkXdIGsi-
KPPt6dAq0_VBJ3mqjXK-tNkU The base64url encoding represents binary data in an ASCII string format by translating the binary data into a radix 64 representation with each digit being one of 64 different characters to represent 6 bits per digit. The 64 characters include the upper case letters "A" through "Z", lower case letters "a" through "z", numbers "0" through "9", and the characters "-" and "_".

At 424, a primary request is sent. In one or more embodiments, the client device generates the primary request, which includes the token received from the login server, the username, and an account identifier, and sends the primary request to the E&P server.

At 425, a shadow identity is identified. In one or more embodiments, the E&P server identifies the shadow identity assigned to the primary identity identified with the primary request. In additional or alternative embodiments when shadow identities are provided on demand, a shadow identity is created for the primary identity upon receipt of the primary request and may be used for a limited duration for additional requests using the same the primary identity.

At 426, a shadow request is generated. In one or more embodiments, the shadow request is generated from the primary request but the primary username is updated to the shadow username and the access token is removed so that the shadow request is being made with the shadow identity instead of the primary identity.

Processes 427 through 432 illustrate a sequence for gaining access to a service provided by the E&P server. At 427, the shadow request is sent. In one or more embodiments, the shadow request is sent from the E&P server to the service access server.

At 428, the shadow request is verified. In one or more embodiments, verification is performed by checking the shadow identity that made the shadow request against the access policies that permit access to the service requested by the shadow request. The verification performed by the service access server is part of the native authentication process used by the cloud provider. The verification is part of the native authentication process in that the shadow identity, shadow username, user groups, and access policies are defined within the cloud provider using the authentication protocols, services, and APIs provided by the cloud provider for authentication.

At 429, an authorized response is sent. In one or more embodiments, when the shadow identity is verified, the authorized response is sent from the service access server to the E&P server indicating that the service may be accessed.

At 430, a tenant token creation request is transmitted. In one or more embodiments, the tenant token creation request is transmitted from the E&P server to the cloud server.

At 431, the creator role is verified. In one or more embodiments, a verification service running on the cloud server verifies that the service of the E&P server that issued the tenant token creation request has the token creator role. When the service has the token creator role, the cloud server generates and signs the tenant token.

At 432, a signed tenant token is returned. In one or more embodiments, the signed tenant token is returned to the E&P server from the cloud server. As an example, a JSON web token with the header:

{"alg": "HS (256)", "typ": "JWT"} and the payload:

{"username":"shadow-user@cloud-provider-domain.name"} that is signed with the secret "shadow-identity-secret" and is encoded in base64url forms the token:

eyJhbGciOiJIUzI1NiIsInR5cCI6IkpXVCJ9.eyJ1c2VybmFtZSI
6InNoYWRvdy11c2VyQGNsb3VkLXByb3ZpZGVyLWRvbWFpbi5uYW1
lIn0.zs9RG6cIwdJaSsPCiViYiRvHH0Tawx-bHPGOdGxV0_k Turning to FIG. 4.2, the sequence (400) continues. Processes 433 through 437 illustrate a sequence for gaining access to a cloud data store hosted by the cloud provider. At 433, the signed tenant token is exchanged. In one or more embodiments, the signed tenant token is sent from the E&P server to the cloud server, which verifies that the shadow identity has the right to access the requested cloud data store.

At 434, a data store access token is returned. In one or more embodiments, the data store access token is returned in response to verifying that the shadow identity is part of an access policy that permits requests made by the shadow identity to access the cloud data store. In one or more embodiments, the data store access token identifies the level of access available to the shared data store and the level of access available to a tenant data store. As an example, a JSON web token with the header:

{"alg": "HS (256)", "typ": "JWT"} and the payload:

{"username":"shadow-user@cloud-provider-domain.name","shared-datastore-access-level":1,"tenant-datastore-access-level":1} that is signed with the secret "data-store-access-secret" and is encoded in base64url forms the token:

eyJhbGciOiJIUzI1NiIsInR5cCI6IkpXVCJ9.eyJ1c2VybmFtZSI
6InNoYWRvdy11c2VyQGNsb3VkLXByb3ZpZGVyLWRvbWFpbi5uYW1
lIiwic2hhcmVkLWRhdGFzdG9yZS1hY2Nlc3MtbGV2ZWwiOjEsInR
lbmFudC1kYXRhc3RvcmUtYWNjZXNzLWxldmVsIjoxfQ.l (493) ZC
hkzQ60G-jQ3MgCgG3kHSGSIb_jebeMzpVRsSE At 435, data in the cloud store is accessed with the data store access token. In one or more embodiments, the E&P server sends an access request with the data store access token to the data access server.

At 436, authorization for data store access is verified. In one or more embodiments, the data access server identifies the location of the data being accessed and verifies the data store access token. The data being accessed may be in a shared data store or in a tenant data store.

At 437, the data and a signed data access token for the shadow user in the requested domain are returned. In one or more embodiments, the data access server returns the data and generates and returns the signed data access token to the E&P server. The signed data access token identifies the data store from which the data was received and is used for subsequent authorized access to the same datastore for the same user. As an example, a JSON web token with the header:

{"alg": "HS (256)", "typ": "JWT"} and the payload:

{"username":"shadow-user@cloud-provider-domain.name","datastore-domain-identifier":"datastore-name"} that is signed with the secret "data-store-domain-secret" and is encoded in base64url forms the token:

eyJhbGciOiJIUzI1NiIsInR5cCI6IkpXVCJ9.eyJ1c2VybmFtZSI
6InNoYWRvdy11c2VyQGNsb3VkLXByb3ZpZGVyLWRvbWFpbi5uYW1
lIiwiZGF0YXN0b3JlLWRvbWFpbi1pZGVudGlmaWVyIjoiZGF0YXN
0b3JlLW5hbWUifQ.EO56YhXwMCz0KSwRxQgBYAt-
sAV1vlSz51fcIj48RXs Processes 438 through 442 illustrate a sequence for gaining access to cloud data storage hosted by the cloud provider. At 438, the signed tenant token is exchanged. In one or more embodiments, the signed tenant token is sent from the E&P server to the cloud server, which verifies that the shadow identity has the right to access the requested cloud data storage.

At 439, a cloud storage access token is returned. In one or more embodiments, the cloud storage access token is return in response to verifying that the shadow identity is part of an access policy that permits requests made by the shadow identity to access the cloud data storage. In one or more embodiments, the cloud storage access token identifies the level of access available to the shared storage and the level of access available to a tenant storage. As an example, a JSON web token with the header:

{"alg": "HS (256)", "typ": "JWT"} and the payload:

{"username":"shadow-user@cloud-provider-domain.name","shared-storage-access-level":1,"tenant-storage-access-level":1} that is signed with the secret "storage-access-secret" and is encoded in base64url forms the token:

eyJhbGciOiJIUzI1NiIsInR5cCI6IkpXVCJ9.eyJ1c2VybmFtZSI
6InNoYWRvoly11c2VyQGNsb3VkLXByb3ZpZGVyLWRvbWFpbi5uYW1
1Iiwic2hhcmVkLXN0b3JhZ2UtYWNjZXNzLWxldmVsIjoxLCJ0ZW5
hbnQtc3RvcmFnZS1hY2Nlc3MtbGV2ZWwiOjF9. OTGyjMW4zUTAyo
1L5qsftTezkNzVDZQrpsnX18C6Zew At 440, a request to get a file from a path is sent. In one or more embodiments, the E&P server send the file request, which includes a path name for the file, to the data access server. The file may be in the shared storage available to multiple clients and tenants or may be in the tenant storage that is available to clients linked to the tenant.

At 441, whether the shadow user is in a user group specified in an access policy for the requested file is verified. In one or more embodiments, the data access server performs the verification to determine that the shadow identity that made the file request has the proper access rights to the file.

At 442, file content is returned. In one or more embodiments, data access server retrieves the file from the cloud storage and returns the file to the E&P server.

Turning to FIG. 4.3, the sequence (400) continues. At 443, data is processed with the service. In one or more embodiments, the E&P server executes programs that perform the service requested in the primary request on the data retrieved using the data access server. The retrieved data may include data from one or more of the shared data store, the tenant data store, the shared cloud storage, and the tenant cloud storage.

At 444, a shadow response is obtained. In one or more embodiments, E&P server obtains the shadow response by generating the shadow response with tenant data or shared data that was processed with the service requested in the primary request. The shadow response is for the shadow identity.

At 445, a primary response is generated from the shadow response. In one or more embodiments, the E&P server combines the payload from the shadow response with a header that references the primary identity to generate the primary response for the primary identity.

At 446, the primary response is sent. In one or more embodiments, the E&P server sends the primary response to the client device in response to the primary request from the client device.

Turning to FIG. 4.4, the sequence (400) continues. Processes 447 through 459 of FIGS. 4.4 and 4.5 illustrate a sequence for subsequent requests. At 447, a subsequent request is received. In one or more embodiments, the subsequent request is received by the E&P server from the client device. In one or more embodiments, the subsequent request is a request for the same or similar services to process data from the same locations. Access to the same service and the same data locations may not involve verification when previously generated access tokens for the primary identity and shadow identity are used for the subsequent access.

At 448, the shadow identity is checked. In one or more embodiments, the E&P server checks that the primary identity associated with the subsequent request is already assigned to an existing shadow identity.

At 449, a subsequent shadow request is generated. In one or more embodiments, the E&P server generates the subsequent shadow request by combining the payload of the subsequent request with a header that identifies the shadow identity.

At 450, data is accessed with the signed data access token. In one or more embodiments, the signed data access token was previously generated for the shadow identity (see 437).

At 451, the signed data access token is verified. In one or more embodiments, the data access server performs the verification by comparing the received token with the token that was previously sent (e.g., at 437).

At 452, data is returned. In one or more embodiments, data access server returns the data requested at 450 in response to verifying the signed data access token.

At 453, a request to get a file using a path is sent. In one or more embodiments, one or more of the file and path names are the same as the previous request at 440.

At 454, whether the shadow user is in a user group specified in an access policy for the requested file is verified. In one or more embodiments, file access permissions may be on a file basis or a path basis.

At 455, the content of the requested file is returned. In one or more embodiments, when the same file is requested, the file may be returned from a cache without having to retrieve the file from the cloud storage.

Turning to FIG. 4.5, the sequence (400) continues. At 456, data is processed with the service. In one or more embodiments, the E&P server executes programs that perform the service requested in the subsequent request on the data retrieved using the data access server.

At 457, a subsequent shadow response is obtained. In one or more embodiments, the E&P server generates the subsequent shadow response and includes data that was processed with the service requested in the subsequent request.

At 458, a subsequent response is generated from the subsequent shadow response. In one or more embodiments, the E&P server combines the payload from the subsequent shadow response with a header that references the primary identity to generate the subsequent response for the primary identity.

At 459, the subsequent response is sent. In one or more embodiments, the E&P server sends the subsequent response to the client device in response to the subsequent request from the client device.

Embodiments may be implemented on a computing system. Any combination of mobile, desktop, server, router, switch, embedded device, or other types of hardware may be used. For example, as shown in FIG. 5.1, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the disclosure may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosure.

The computing system (500) in FIG. 5.1 may be connected to or be a part of a network. For example, as shown in FIG. 5.2, the network (520) may include multiple nodes (e.g., node X (522), node Y (524)). Nodes may correspond to a computing system, such as the computing system shown in FIG. 5.1, or a group of nodes combined may correspond to the computing system shown in FIG. 5.1. By way of an example, embodiments of the disclosure may be implemented on a node of a distributed system that is connected to other nodes. By way of another example, embodiments of the disclosure may be implemented on a distributed computing system having multiple nodes, where portions of the disclosure may be located on a different node within the distributed computing system. Further, one or more elements of the aforementioned computing system (500) may be located at a remote location and connected to the other elements over a network.

Although not shown in FIG. 5.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5.1. Further, the client device (526) may include and/or perform at least a portion of one or more embodiments of the disclosure.

The computing system or group of computing systems described in FIGS. 5.1 and 5.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, one authorized process may mount the shareable segment, other than the initializing process, at any given time.

Other techniques may be used to share data, such as the various data described in the present application, between processes without departing from the scope of the disclosure. The processes may be part of the same or different application and may execute on the same or different computing system.

Rather than or in addition to sharing data between processes, the computing system performing one or more embodiments of the disclosure may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosure, may extract one or more data items from the obtained data. For example, the extraction may be performed as follows by the computing system in FIG. 5.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where tokens may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 5.1, while performing one or more embodiments of the disclosure, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosure, A and B may be vectors, and comparing A with B may compare the first element of vector A with the first element of vector B, the second element of vector A with the second element of vector B, etc. In one or more embodiments, if A and B are strings, the binary values of the strings may be compared.

The computing system in FIG. 5.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others.

The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 5.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents a few examples of functions performed by the computing system of FIG. 5.1 and the nodes and/or client device in FIG. 5.2. Other functions may be performed using one or more embodiments of the disclosure.

While the disclosure has been described with respect to a limited number of embodiments, those skilled in the art, having benefit of this disclosure, will appreciate that other embodiments can be devised which do not depart from the scope of the disclosure. Accordingly, the scope of the disclosure should be limited only by the attached claims.

What is claimed is:

1. A method comprising:
   receiving a primary request that includes a primary identity and is for a service that is provided by a services provider, wherein the service is within a service container group hosted by a cloud provider;
   generating a shadow request from the primary request, wherein the shadow request includes a shadow identity that is created when the primary identity is created and is linked to the primary identity from the primary request;
   authorizing the shadow request by verifying that the shadow identity has access to the service;
   generating a tenant token for the shadow identity in response to authorizing the shadow request;
   obtaining an access token using native authorization of the cloud provider in exchange for the tenant token, wherein the access token is a data store access token and provides the shadow identity with access to a tenant data repository of a tenant container group of a set of tenant container groups hosted by the cloud provider;
   sending a data access request with the data store access token to a data access service that verifies authorization for access to a tenant data store of the tenant data repository;
   accessing tenant data from the tenant data repository using the access token;
   obtaining a shadow response that is generated for the shadow identity and includes processed tenant data generated by processing the tenant data from the tenant data repository with the service; and
   sending a primary response that is for the primary identity and is generated from the shadow response, wherein generating the primary response removes references to the shadow identity by replacing the shadow identity with the primary identity linked to the shadow identity.

2. The method of claim 1, wherein a cloud provider account of the services provider includes a set of container groups that includes the service container group and the set of tenant container groups.

3. The method of claim 1, further comprising:
   in response to the data access request, receiving data store data that is part of the tenant data and receiving a signed data store access token generated from the data store access token.

4. The method of claim 3, further comprising:
   obtaining a storage access token using the native authorization of the cloud provider in exchange for the tenant token, wherein the storage access token provides access to tenant storage of the tenant data repository of the tenant container group of the set of tenant container groups hosted by the cloud provider.

5. The method of claim 4, further comprising:
   sending a file access request with the storage access token to the data access service that verifies that the shadow identity is in a user group specified in an access policy that provides access to tenant storage that stores a file identified in the file access request; and
   receiving, in response to the file access request, the file, which is part of the tenant data.

6. The method of claim 5, further comprising:
   receiving a subsequent request for the service that includes the primary identity;
   checking the shadow identity to identify the signed data store access token;
   sending a subsequent data access request with the signed data store access token to the data access service that provides verification using the signed data store access token;
   receiving subsequent tenant data from the tenant data store; and
   obtaining a subsequent shadow response that is generated for the shadow identity and includes subsequent processed tenant data generated by processing the subsequent tenant data from the tenant data repository with the service; and sending a subsequent response generated from a subsequent shadow response.

7. A system comprising:
a server with a memory coupled to a processor;
the memory comprising a service;
the service executes on the processor, uses the memory, and is configured for:
receiving a primary request that includes a primary identity and is for a service that is provided by a services provider, wherein the service is within a service container group hosted by a cloud provider;
generating a shadow request from the primary request, wherein the shadow request includes a shadow identity that is created when the primary identity is created and is linked to the primary identity from the primary request;
authorizing the shadow request by verifying that the shadow identity has access to the service;
generating a tenant token for the shadow identity in response to authorizing the shadow request;
obtaining an access token using native authorization of the cloud provider in exchange for the tenant token, wherein the access token is a data store access token and provides the shadow identity with access to a tenant data repository of a tenant container group of a set of tenant container groups hosted by the cloud provider;
sending a data access request with the data store access token to a data access service that verifies authorization for access to a tenant data store of the tenant data repository;
accessing tenant data from the tenant data repository using the access token;
obtaining a shadow response that is generated for the shadow identity and includes processed tenant data generated by processing the tenant data from the tenant data repository with the service; and
sending a primary response that is for the primary identity and is generated from the shadow response, wherein generating the primary response removes references to the shadow identity by replacing the shadow identity with the primary identity linked to the shadow identity.

8. The system of claim 7, wherein a cloud provider account of the services provider includes a set of container groups that includes the service container group and the set of tenant container groups.

9. The system of claim 7, wherein the service is further configured for:
in response to the data access request, receiving data store data that is part of the tenant data and receiving a signed data store access token generated from the data store access token.

10. The system of claim 9, wherein the service is further configured for:
obtaining a storage access token using the native authorization of the cloud provider in exchange for the tenant token, wherein the storage access token provides access to tenant storage of the tenant data repository of the tenant container group of the set of tenant container groups hosted by the cloud provider.

11. The system of claim 10, wherein the service is further configured for:
sending a file access request with the storage access token to the data access service that verifies that the shadow identity is in a user group specified in an access policy that provides access to tenant storage that stores a file identified in the file access request; and
receiving, in response to the file access request, the file, which is part of the tenant data.

12. The system of claim 11, wherein the service is further configured for:
receiving a subsequent request for the service that includes the primary identity;
checking the shadow identity to identify the signed data store access token;
sending a subsequent data access request with the signed data store access token to the data access service that provides verification using the signed data store access token;
receiving subsequent tenant data from the tenant data store; and
obtaining a subsequent shadow response that is generated for the shadow identity and includes subsequent processed tenant data generated by processing the subsequent tenant data from the tenant data repository with the service; and
sending a subsequent response generated from a subsequent shadow response.

13. A non-transitory computer readable medium comprising computer readable program code for:
receiving a primary request that includes a primary identity and is for a service that is provided by a services provider, wherein the service is within a service container group hosted by a cloud provider;
generating a shadow request from the primary request, wherein the shadow request includes a shadow identity that is created when the primary identity is created and is linked to the primary identity from the primary request;
authorizing the shadow request by verifying that the shadow identity has access to the service;
generating a tenant token for the shadow identity in response to authorizing the shadow request;
obtaining an access token using native authorization of the cloud provider in exchange for the tenant token, wherein the access token is a data store access token and provides the shadow identity with access to a tenant data repository of a tenant container group of a set of tenant container groups hosted by the cloud provider;
sending a data access request with the data store access token to a data access service that verifies authorization for access to a tenant data store of the tenant data repository;
accessing tenant data from the tenant data repository using the access token;
obtaining a shadow response that is generated for the shadow identity and includes processed tenant data generated by processing the tenant data from the tenant data repository with the service; and
sending a primary response that is for the primary identity and is generated from the shadow response, wherein generating the primary response removes references to the shadow identity by replacing the shadow identity with the primary identity linked to the shadow identity.

14. The non-transitory computer readable medium of claim 13, wherein a cloud provider account of the services provider includes a set of container groups that includes the service container group and the set of tenant container groups.

15. The non-transitory computer readable medium of claim 13, further comprising computer readable program code for:
- in response to the data access request, receiving data store data that is part of the tenant data and receiving a signed data store access token generated from the data store access token.

16. The non-transitory computer readable medium of claim 15, further comprising computer readable program code for:
- obtaining a storage access token using the native authorization of the cloud provider in exchange for the tenant token, wherein the storage access token provides access to tenant storage of the tenant data repository of the tenant container group of the set of tenant container groups hosted by the cloud provider.

17. The non-transitory computer readable medium of claim 16, further comprising computer readable program code for:
- sending a file access request with the storage access token to the data access service that verifies that the shadow identity is in a user group specified in an access policy that provides access to tenant storage that stores a file identified in the file access request; and
- receiving, in response to the file access request, the file, which is part of the tenant data.

* * * * *